United States Patent
Raghunath et al.

(10) Patent No.: US 12,238,080 B2
(45) Date of Patent: Feb. 25, 2025

(54) ACCELERATED RECONNECTION IN AUTHENTICATED NETWORKS

(71) Applicant: ZEBRA TECHNOLOGIES CORPORATION, Lincolnshire, IL (US)

(72) Inventors: Aparna Raghunath, Bangalore (IN); Dhanya Jalaja Ramachandran, Bangalore (IN)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

(21) Appl. No.: 17/325,972

(22) Filed: May 20, 2021

(65) Prior Publication Data

US 2022/0377061 A1    Nov. 24, 2022

(51) Int. Cl.
*H04L 9/40* (2022.01)
*G06F 21/45* (2013.01)
*H04L 9/08* (2006.01)

(52) U.S. Cl.
CPC ............ *H04L 63/068* (2013.01); *G06F 21/45* (2013.01); *H04L 9/0897* (2013.01)

(58) Field of Classification Search
CPC ...... H04L 63/068; H04L 9/0897; G06F 21/45
(Continued)

(56) References Cited

U.S. PATENT DOCUMENTS

| 1,112,869 | A | * | 10/1914 | Tirrell | F16D 3/221 |
| | | | | | 464/82 |
| 2003/0188195 | A1 | * | 10/2003 | Abdo | H04L 63/08 |
| | | | | | 709/227 |

(Continued)

FOREIGN PATENT DOCUMENTS

| FR | 3042626 A1 | * | 4/2017 |
| JP | 2004242187 A | * | 8/2004 |

(Continued)

OTHER PUBLICATIONS

Li et al., "A Neighbor Caching Mechanism for Handoff in IEEE 802.11 Wireless Networks," 2007 International Conference on Multimedia and Ubiquitous Engineering (MUE'07), 2007, pp. 48-53, doi: 10.1109/MUE.2007.32. (Year: 2007).*

Namal et al., "Lightweight authentication and key management on 802.11 with Elliptic Curve Cryptography," 2013 IEEE Wireless Communications and Networking Conference (WCNC), 2013, pp. 1830-1835, doi: 10.1109/WCNC.2013.6554842. (Year: 2013).*

(Continued)

*Primary Examiner* — Peter C Shaw

(57) ABSTRACT

A method in a client computing device includes: establishing an association with a communications network in a first connection time period; via an authentication session with an authentication server of a communications network in an authentication time period following the first connection time period, obtaining at least one key value for use in accessing the communications network; storing reauthentication data associated with the at least one key value; responsive to disconnecting from the communications network, discarding the at least one key value and retaining the reauthentication data; responsive to a reconnection command: deriving the at least one key value from the reauthentication data, establishing a further association with the communications network in a second connection time period by sending an association request to the communications network, the association request containing the at least one key value, and accessing network resources via the communications network following the second connection time period.

14 Claims, 6 Drawing Sheets

(58) Field of Classification Search
USPC .......................................................... 726/6
See application file for complete search history.

(56) References Cited

U.S. PATENT DOCUMENTS

| | | | | |
|---|---|---|---|---|
| 2006/0242415 | A1* | 10/2006 | Gaylor | H04L 9/3271 713/176 |
| 2010/0228982 | A1* | 9/2010 | Zhu | H04L 9/3271 713/175 |
| 2014/0273958 | A1* | 9/2014 | Messana | H04L 63/0892 455/411 |
| 2019/0044723 | A1* | 2/2019 | Prakash | H04L 9/3234 |
| 2020/0274721 | A1* | 8/2020 | Melo | H04L 63/083 |
| 2022/0377061 | A1* | 11/2022 | Raghunath | H04L 9/0897 |

FOREIGN PATENT DOCUMENTS

| | | | | | |
|---|---|---|---|---|---|
| JP | 2005346401 | A | * | 12/2005 | |
| JP | 2011101118 | A | * | 5/2011 | |
| JP | 2014013960 | A | * | 1/2014 | |
| WO | WO-2005036857 | A1 | * | 4/2005 | G06F 21/31 |
| WO | WO-2020052531 | A1 | * | 3/2020 | H04W 12/02 |
| WO | WO-2020215272 | A1 | * | 10/2020 | |
| WO | WO-2021094103 | A1 | * | 5/2021 | H04W 12/041 |

OTHER PUBLICATIONS

Indra et al., "An ECC-Time Stamp Based Mutual Authentication and Key Management Scheme for WSNs," 2013 27th International Conference on Advanced Information Networking and Applications Workshops, 2013, pp. 883-889, doi: 10.1109/WAINA.2013.52. (Year: 2013).*

Kim et al., "Enhancing Security Using the Discarded Security Information in Mobile WiMAX Networks," IEEE Globecom 2008—2008 IEEE Global Telecommunications Conference, New Orleans, LA, USA, 2008, pp. 1-5, doi: 10.1109/GLOCOM.2008.ECP.394. (Year: 2008).*

Komarova et al., "Fast Re-Authentication Protocol for Inter-Domain Roaming," 2007 IEEE 18th International Symposium on Personal, Indoor and Mobile Radio Communications, Athens, Greece, 2007, pp. 1-5, doi: 10.1109/PIMRC.2007.4394525. (Year: 2007).*

Hoeper et al., "Distribution of EAP-Based Keys for Handover and ReAuthentication (RFC5749)", IPCOM000193862D, Mar. 1, 2010, pp. 1-12. (Year: 2010).*

Xu et al., "The Performance Analysis of Fast EAP Re-authentication Protocol," 2008 International Symposium on Computer Science and Computational Technology, Shanghai, China, 2008, pp. 99-103, doi: 10.1109/ISCSCT.2008.164. (Year: 2008).*

Clancy et al., "Handover Key Management and Re-Authentication Problem Statement (RFC5169)", IPCOM000168869D, Mar. 1, 2008. (Year: 2008).*

Kim et al., "An efficient and scalable re-authentication protocol over wireless sensor network," in IEEE Transactions on Consumer Electronics, vol. 57, No. 2, pp. 516-522, May 2011, doi: 10.1109/TCE.2011.5955187. (Year: 2011).*

Hoeper et al. "Distribution of EAP-Based Keys for Handover and ReAuthentication (RFC5749)," IP.com, IPCOM000193862D, Mar. 1, 2010. (Year: 2010).*

Rajagopal, "Security Enhancement Using Cache Based Reauthentication in WiMAX Based E-Learning System," PubMed Central ID: 4553329, 10.1155/2015/878327, Jan. 1, 2015. (Year: 2015).*

* cited by examiner

ACCELERATED RECONNECTION IN AUTHENTICATED NETWORKS

BACKGROUND

Certain networks, e.g. private networks deployed by corporations or other institutions, may implement authentication mechanisms to control access to network resources by client devices. For example, a private network may include an authentication server such as a Remote Authentication Dial-In User Service (RADIUS) server, responsible for authenticating a client device attempting to access resources on the network. Through the authentication process, which may be conducted according to the Extensible Authentication Protocol (EAP), the client device and the authentication server generate one or more key values that enable subsequent access to network resources by the client device.

In such systems, disconnection of the client device from the network results in the loss of the above-mentioned key values. The authentication process is therefore repeated when the client device reconnects to the network, imposing additional load on the authentication server, as well as contributing to congestion on the network and lengthening the period of time during which the client device is unable to access network resources.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
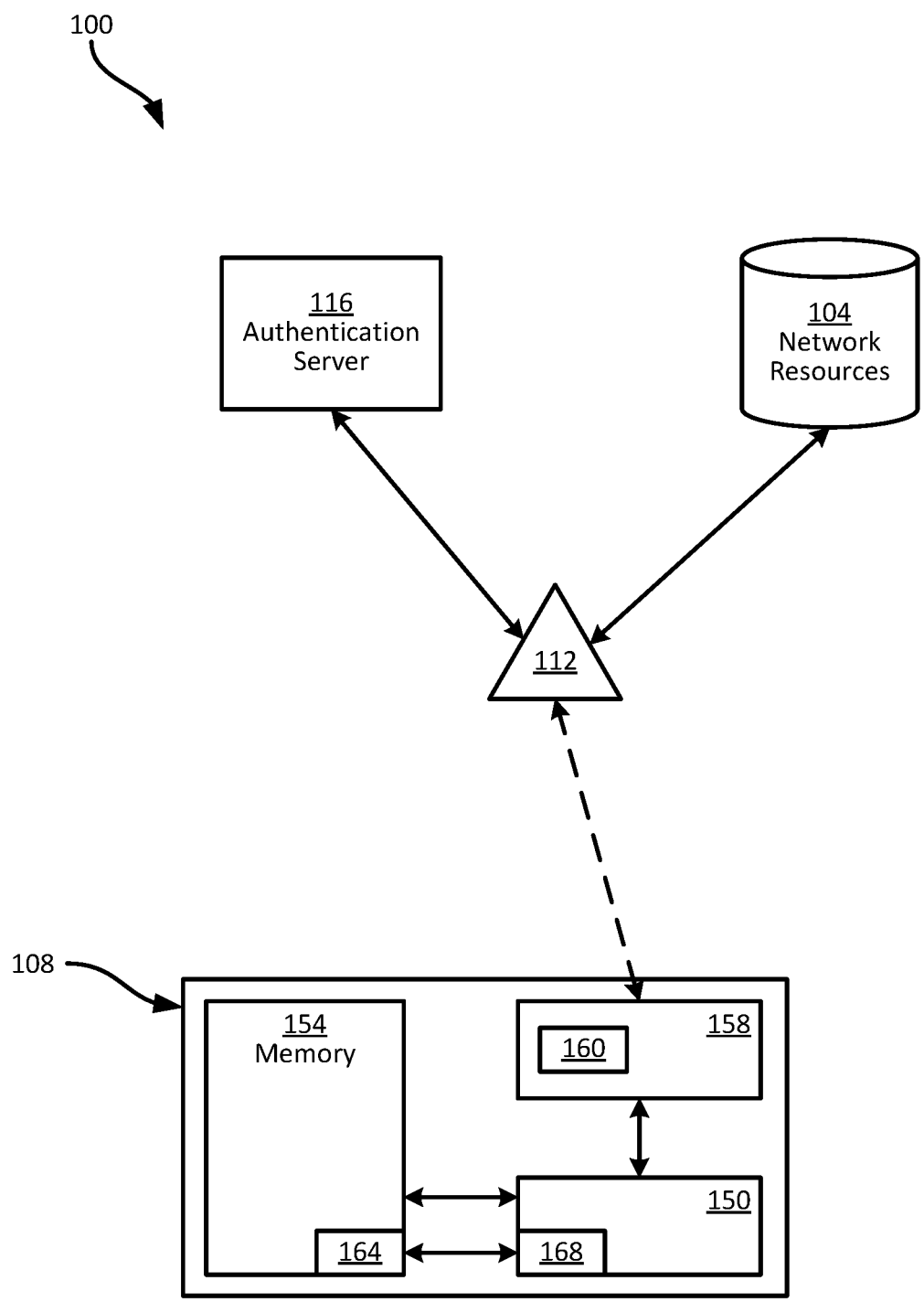
FIG. 1 is a diagram of a communications system for accelerated reconnection.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Examples disclosed herein are directed to a method comprising: establishing an association with a communications network in a first connection time period; via an authentication session with an authentication server of a communications network in an authentication time period following the first connection time period, obtaining at least one key value for use in accessing the communications network; storing reauthentication data associated with the at least one key value; responsive to disconnecting from the communications network, discarding the at least one key value and retaining the reauthentication data; responsive to a reconnection command: deriving the at least one key value from the reauthentication data, establishing a further association with the communications network in a second connection time period by sending an association request to the communications network, the association request containing the at least one key value, and accessing network resources via the communications network following the second connection time period.

Additional examples disclosed herein are directed to a computing device, comprising: a memory; a communications interface; and a controller configured to: establish an association with a communications network in a first connection time period; via an authentication session with an authentication server of the communications network in an authentication time period following the first connection time period, obtain at least one key value for use in accessing the communications network; store, in the memory, reauthentication data associated with the at least one key value; responsive to detecting a disconnection from the communications network, discard the at least one key value and retaining the reauthentication data; responsive to a reconnection command; derive the at least one key value from the reauthentication data, establish a further association with the communications network in a second connection time period by sending an association request to the communications network, the association request containing the at least one key value, and access network resources via the communications network following the second connection time period.

Further examples disclosed herein are directed to a non-transitory computer readable medium storing instructions executable by a controller of a computing device having a memory and a communications interface, to: establish an association with a communications network in a first connection time period; via an authentication session with an authentication server of the communications network in an authentication time period following the first connection time period, obtain at least one key value for use in accessing the communications network; store, in the memory, reauthentication data associated with the at least one key value; responsive to detecting a disconnection from the communications network, discard the at least one key value and retaining the reauthentication data; responsive to a reconnection command: derive the at least one key value from the reauthentication data, establish a further association with the communications network in a second connection time period by sending an association request to the communications network, the association request containing the at least one key value, and access network resources via the communications network following the second connection time period.

FIG. 1 illustrates a communications system 100 implementing an authenticated network. For example, the network implemented by the system 100 can be a private corporate or other institutional network. In the system 100, network resources 104 such as data, application servers, or the like, are accessible to a client device 108 via one or more access points (APs) 112, such as a wireless access point implementing a WiFi or other suitable network. Although a single AP 112 is shown in FIG. 1, it will be apparent that the system 100 can include a plurality of APs 112, disposed throughout a facility or other physical area according to the size and other physical characteristics of the facility. Further, it will be understood that a plurality of client devices 108 can be present in the system 100, although a single device 108 is shown for illustrative purposes. The client device 108 can be a mobile computer such as a laptop, a tablet, a smart phone, or the like.

The network implemented by the system 100 is an authenticated network, in which the client device 108 (and any other client devices attempting to access the network resources 104) is permitted to access the network resources 104 only after completing an authentication process, also referred to herein as an authentication session. To that end, the system 100 includes an authentication server 116 connected to the AP 112. The AP 112 is configured, in response to receiving a connection request from the device 108 (also referred to as an association request), to determine whether the device 108 has been authenticated (e.g. granted permission by the authentication server 116 to access the network resources 104). When the device 108 has not yet been authenticated, the AP 112 permits the device 108 to communicate only with the authentication server 116, to perform an authentication process.

The authentication process can be conducted according to the Extensible Authentication Protocol (EAP), which specifies various methods of authenticating the device 108 to access the network resources 104. In general, the authentication process includes a sequence of messages exchanges between the device 108 and the authentication server 116, via the AP 112. The messages provide an identity associated with the device 108 (e.g. an account name or the like) to the authentication server 116, and can also include a challenge response such as a password or the like. At the conclusion of the authentication process, presuming that authentication was successful, the client device 108 and the AP 112 are provisioned by the authentication server 116 with at least one key value for subsequent use in accessing the network resources 104.

The authentication process mentioned above can involve an exchange of about 20 frames of data, and can extend over a time period of about two seconds, dependent on the specific implementation of the system 100. During the authentication process, certain computational load is imposed on the authentication server 116, the AP 112, and the client device 108. Further, the exchange of messages contributes to at least a certain degree to congestion in the network. Still further, during the authentication process, the device 108 is unable to access the network resources 104.

If the device 108 disconnects from the network (e.g. disassociates from the AP 112 without associating with another AP in the same network), the above-mentioned key values, which are not stored persistently, are automatically discarded by the device 108. Therefore, when the device 108 attempts to reconnect to the AP 112, the authentication process is repeated, consuming further system resources, even when the disconnection was brief and/or accidental (e.g. due to physical interference, loss of power at the device 108, or the like).

The device 108 therefore also implements additional functionality, as discussed below, to mitigate the need to repeat the authentication process upon reconnecting to the network, thus reducing downtime for the device 108 (i.e. time during which the network resources 104 are unavailable to the device 108) as well as reducing load on the remainder of the system 100.

Certain internal components of the device 108 are also illustrated in FIG. 1. Specifically, the device 108 includes a central processing unit (CPU), also referred to as a processor 150, interconnected with a non-transitory computer readable storage medium, such as a memory 154. The memory 154 includes any suitable combination of volatile (e.g. Random Access Memory (RAM)) and non-volatile (e.g. read only memory (ROM), Electrically Erasable Programmable Read Only Memory (EEPROM), flash) memory. The processor 150 and the memory 154 each comprise one or more integrated circuits (ICs).

The device 108 also includes a communication interface 158, enabling the device 108 to exchange data with other computing devices, including the AP 112 and (via the AP 112) the authentication server 116 and the network resources 104. The communication interface 158 includes any suitable hardware (e.g. transmitters, receivers, network interface controllers and the like) and associated firmware, software and the like allowing the client device 108 to communicate as set out above. As illustrated in FIG. 1, the interface 158 includes a controller 160, such as an integrated circuit distinct from the processor 150, that is configured to execute the authentication process mentioned above, and to obtain and store the key value(s) while the device 108 is connected to the network.

The memory 154 stores a plurality of applications, each including a plurality of computer readable instructions executable by the processor 150. The execution of the above-mentioned instructions by the processor 150 causes the device 104 to implement certain functionality, as discussed herein. The memory 154 and the processor 150 can also implement a secure storage subsystem, e.g. including a secure memory 164 and a cryptographic controller or other suitable execution hardware element with exclusive access to the secure memory 164. The specific implementation of the secure storage subsystem may vary between different client devices 108. For example, in some implementations the memory 164 and controller 168 can be implemented as a separate circuit distinct from the memory 154 and the processor 150.

The secure storage subsystem is configured to store cryptographic keys, and to control access to such keys. For example, the Android Keystore implementation of the secure storage subsystem prevents release of key material stored therein to other portions of the device 108. That is, other applications executing on the device 108, such as applications stored in memory 154, or the controller 160, can send requests to the controller 168 that make use of key material stored therein, and be provided the output of such operations, but may be prevented from accessing the key material itself.

The device 108 can be configured to make use of the secure storage subsystem to facilitate reconnection to authenticated networks when authentication has previously been completed, as will be described below in greater detail.

The client device 108 can also include at least one input device, and at least one output device (not shown) interconnected with the processor 150. The input device(s) can include any suitable one, or any suitable combination of, a microphone, a camera, a touch screen, a keypad, a trigger (e.g. to initiate the performance of any encoding task), and the like. The output device(s) can include any suitable one, or any suitable combination of a display (e.g., integrated with the above-mentioned touch screen), a speaker, and the like.

The components of the device 108 are interconnected by communication buses, and powered by a battery or other power source, over the above-mentioned communication buses or by distinct power buses.

Figure 2:
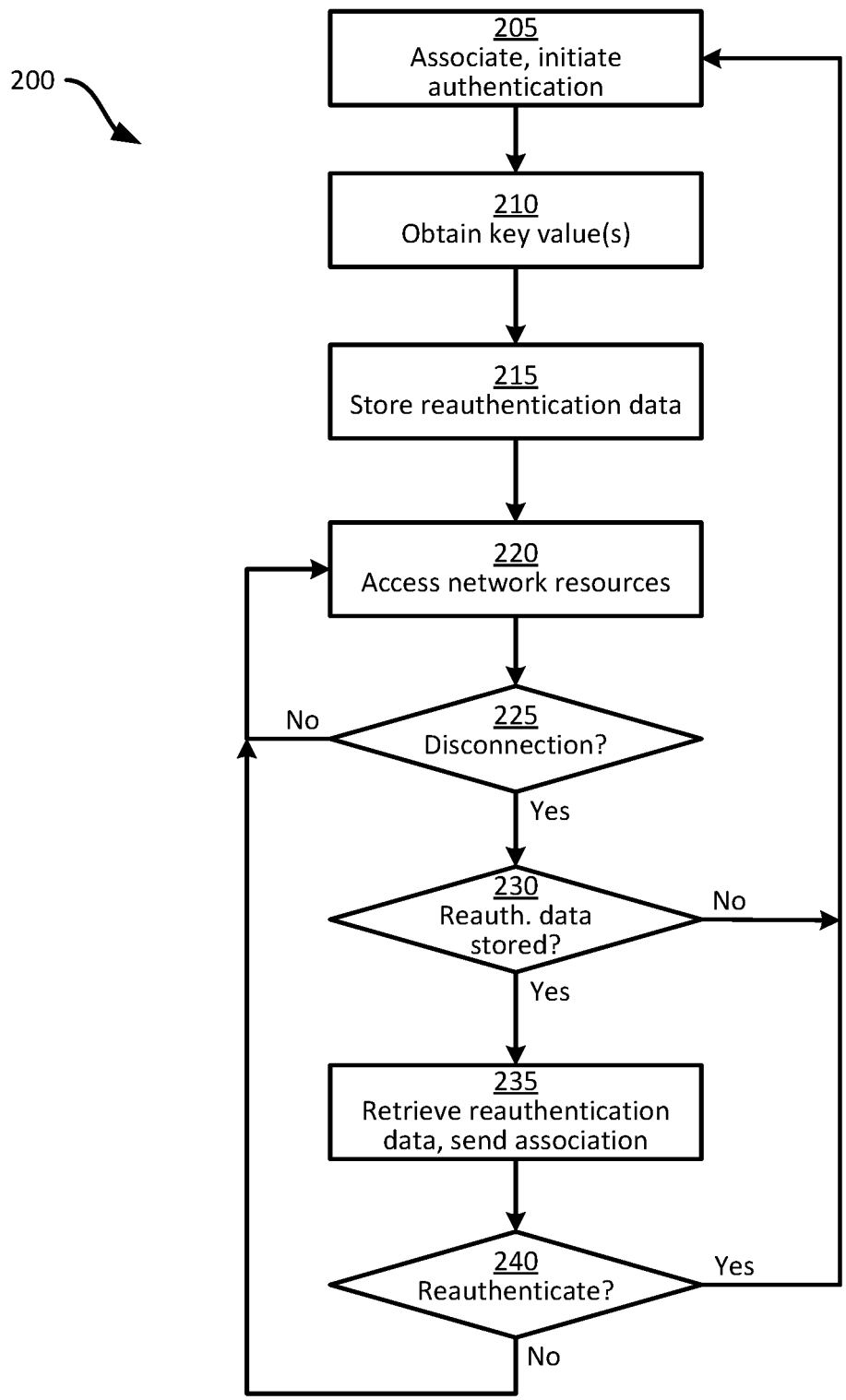
FIG. 2 is a flowchart of a method for accelerated reconnection in authenticated networks.

Turning now to FIG. 2, a method 200 of accelerated reconnection in authenticated networks. The method 200 will be described in conjunction with its performance in the system 100. More specifically, the method 200 as described below is performed by the client device 108.

At block 205, the device 108 is configured to associate with the AP 112 and initiate the authentication process. More specifically, when the device 108 sends an association request to the AP 112, the AP 112 is configured to determine whether the AP 112 has been provisioned (by the server 116) with authentication data for the device 108, in the form of the above-mentioned key value(s). It is assumed in this example that the device 108 has not previously authenticated with the network. Therefore, the AP 112 directs the device 108 to the authentication server 116, and the device 108 and server 116 exchange the message sequence mentioned earlier. As will be apparent, the association process itself, establishing a link between the device 108 and the AP 112, consumes a first time period, also referred to as a connection time period. The authentication process described below, when required, consumes a second time period (also referred to as an authentication time period) following the first time period.

If the authentication process fails, the device 108 is denied access to the network, and the performance of the method 200 ends. When the authentication process is successful, at block 210 the device 108 obtains at least one key value. In the context of an EAP-based authentication process, the key value includes a pairwise master key (PMK), which is also provided to the AP 112. From the PMK, the AP 112 can assign a PMKID to the device 108. The PMKID can be derived (e.g. via a hashing algorithm) from a combination of the PMK, a network address of the AP 112, and a network address of the client device 108 (e.g. MAC addresses of the AP 112 and device 108). The PMKID is an identifier unique to the device 108, and indicates to the AP 112 in subsequent communications that the device 108 has been authenticated. Other examples of key values obtained by the device 108 at block 210 can include a PMK security association (PMKSA), which associates the PMKID with other information, such as a lifetime of the PMK. The device 108 can maintain a distinct PMKSA (based on the same underlying PMKID) for each AP 112 in the network with which the device 108 has associated, to enable roaming without reauthentication.

The key values mentioned above, which are employed by the device 108 to subsequently access the network resources 104 (as described below in connection with block 220), are themselves derived from underlying key material. For example, in response to successful authentication at block 205, the performance of block 210 can include the generation of an intermediate key, such as the root key in the EAP process. Subsequent key values, including a master session key (MSK), from which the above-mentioned PMK is derived, are in turn derived from the root key or other suitable intermediate key. In some systems, such intermediate keys are discarded upon use to generate the MSK, PMK and the like. The device 108, however, as will be seen below, is configured to retain an intermediate key for later use during a reconnection process.

Figure 3:
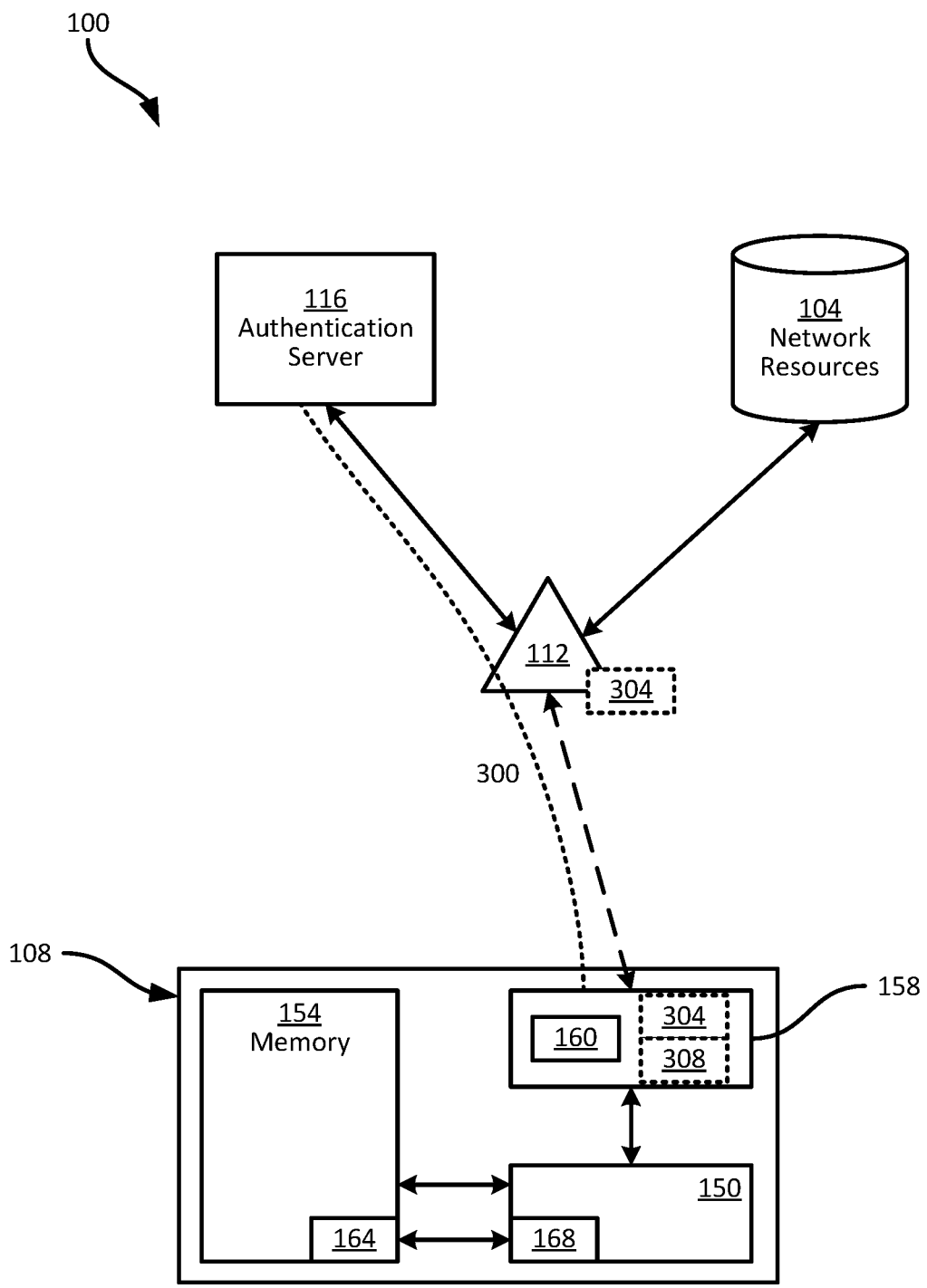
FIG. 3 is a diagram illustrating an example performance of blocks 205 and 210 of the method of FIG. 2.

Turning briefly to FIG. 3, an example performance of blocks 205 and 210 are illustrated. As shown in FIG. 3, the device 108 establishes, via the communications interface 158, a link with the AP 112, and is directed to complete an sequence 300 of messages with the authentication server 116. Completion of the authentication process represented by the sequence 300 results in the AP 112 and the communications interface 158 being provisioned with at least one key value 304, as described above. The at least one key value 304 is maintained in volatile memory at the communications interface 158. That is, the at least one key value 304 is not stored persistently. As noted above, obtaining the at least one key value 304 is accomplished by obtaining intermediate key value(s) 308, such as the above-mentioned root key, from which the key value(s) 304 are derived. The intermediate key value(s) are therefore retained, temporarily, at the communications interface 158 for use in generating the key value(s) 304.

Returning to FIG. 2, following completion of block 210 the device 108 proceeds to block 215. At block 215, the device 108 stores, in a persistent storage element (as opposed to the volatile storage of the key value(s) 304 mentioned above), reauthentication data that is associated with the key value(s) 304. To mitigate the introduction of security risks by persistent storage of the key value(s) 304, the reauthentication data is not the key values 304 themselves, but rather at least one intermediate key associated with the key value(s) 304. For example, the controller 160 or the processor 150 can be configured, instead of discarding the intermediate key value(s) 308 after generation of the key value(s) 304, to persistently store the intermediate key value(s) 308 as reauthentication data.

The device 108 is configured to store the reauthentication data in the secure memory 164. As will be apparent in the discussion below, storage of the reauthentication data in the secure memory 164, which is a persistent storage device, such as flash memory, enables the use of the reauthentication data after the device 108 has disconnected from the AP 112. In contrast, the key value(s) 304 stored at the communication interface 158 are not stored persistently, and are therefore discarded automatically when the connection between the device 108 and the AP 112 ends.

At block 220, the device 108 is configured to access the network resources 104 via the AP 112. In particular, as will be apparent, following the successful completion of the authentication process, the key value(s) 304 can be used in a handshake process (e.g. a four-way handshake) between the device 108 and the AP 112 to generate additional cryptographic keys that are used to encrypt communications between the device 108 and the network. For example, the PMK can be employed during the handshake process to generate either or both of a pairwise transient key (PTK) and a group transient key (GTK) for encrypting further communications.

Figure 4:
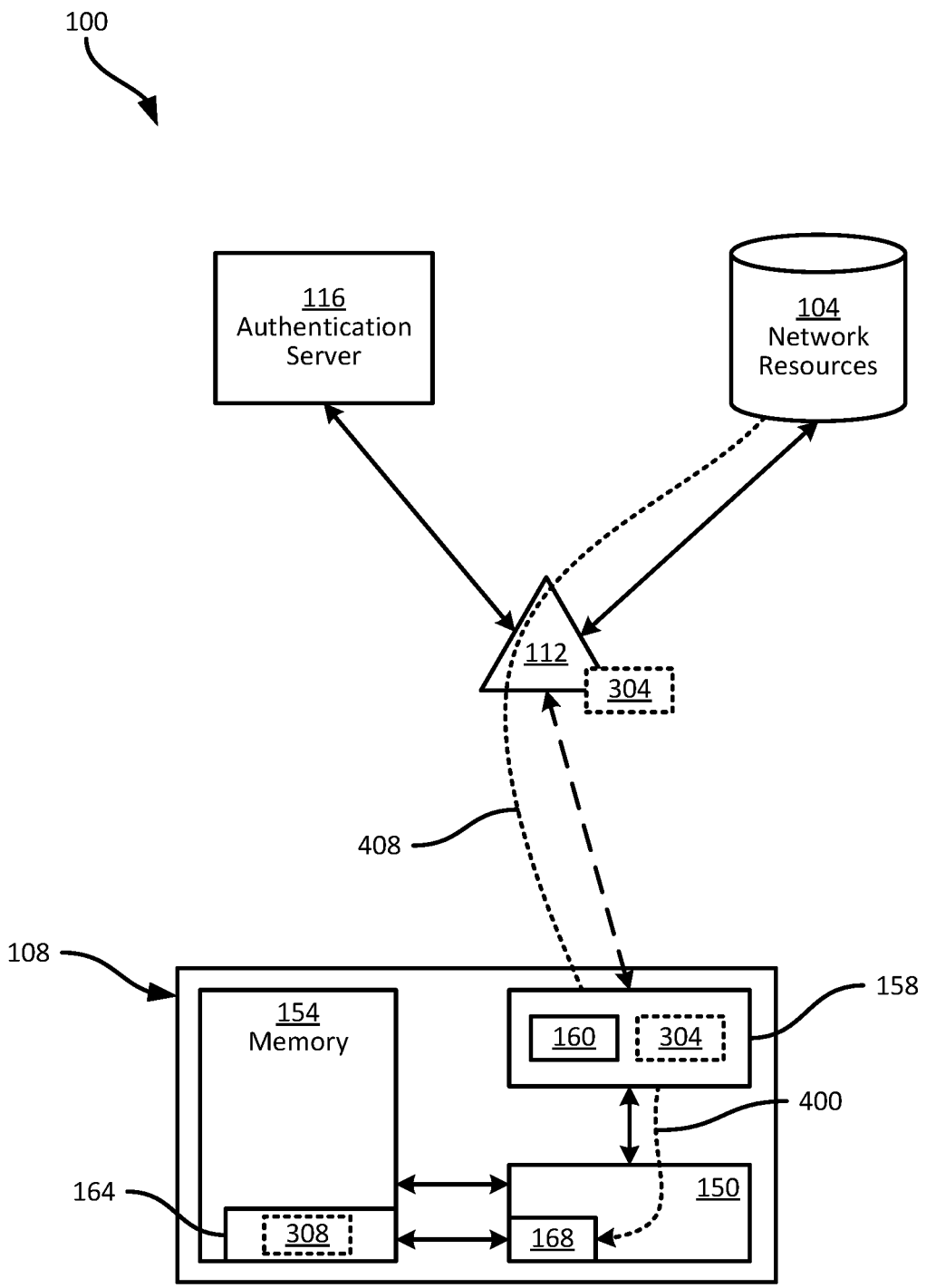
FIG. 4 is a diagram illustrating an example performance of blocks 215 and 220 of the method of FIG. 2.

Referring to FIG. 4, the controller 160 and/or the processor 150 can generate a request 400, e.g. using a suitable application programming interface (API), to the controller 168 to store reauthentication data associated with the key value(s) 304. In the illustrated example, the reauthentication data includes the intermediate key(s) 308, and is stored in the secure memory 164 as shown, although no longer stored at the communications interface 158 itself (having been discarded upon successful generation of the key value(s) 304). Meanwhile, the device 108 is enabled, via completion of the authentication process and the keys obtained via the handshake process above, to access the network resources 104 in a communication session 408.

At block 225, the device 108 is configured to determine whether a disconnection event has occurred. A disconnection event is a loss of connection to the network, rather than a disassociation from the AP 112 and association with another AP of the network. That is, a disconnection event is distinct from a roaming event. The disconnection event can occur because of a loss of signal from the AP 112, e.g. due to physical interference imposed by objects near the device 108. In other examples, the disconnection event can result from a loss of power to the device 108, whether resulting from a loss of battery power or from a shutdown command selected by an operator of the device 108. Various other types of disconnection events will also be apparent from the above.

In general, the disconnection event results in the device 108 having no remaining association with the AP 112 or any other AP of the network in the system 100. When no disconnection event is detected, access of the network resources 104 can continue at block 220. When a disconnection event is detected, however, the device 108 proceeds to block 230.

Figure 5:
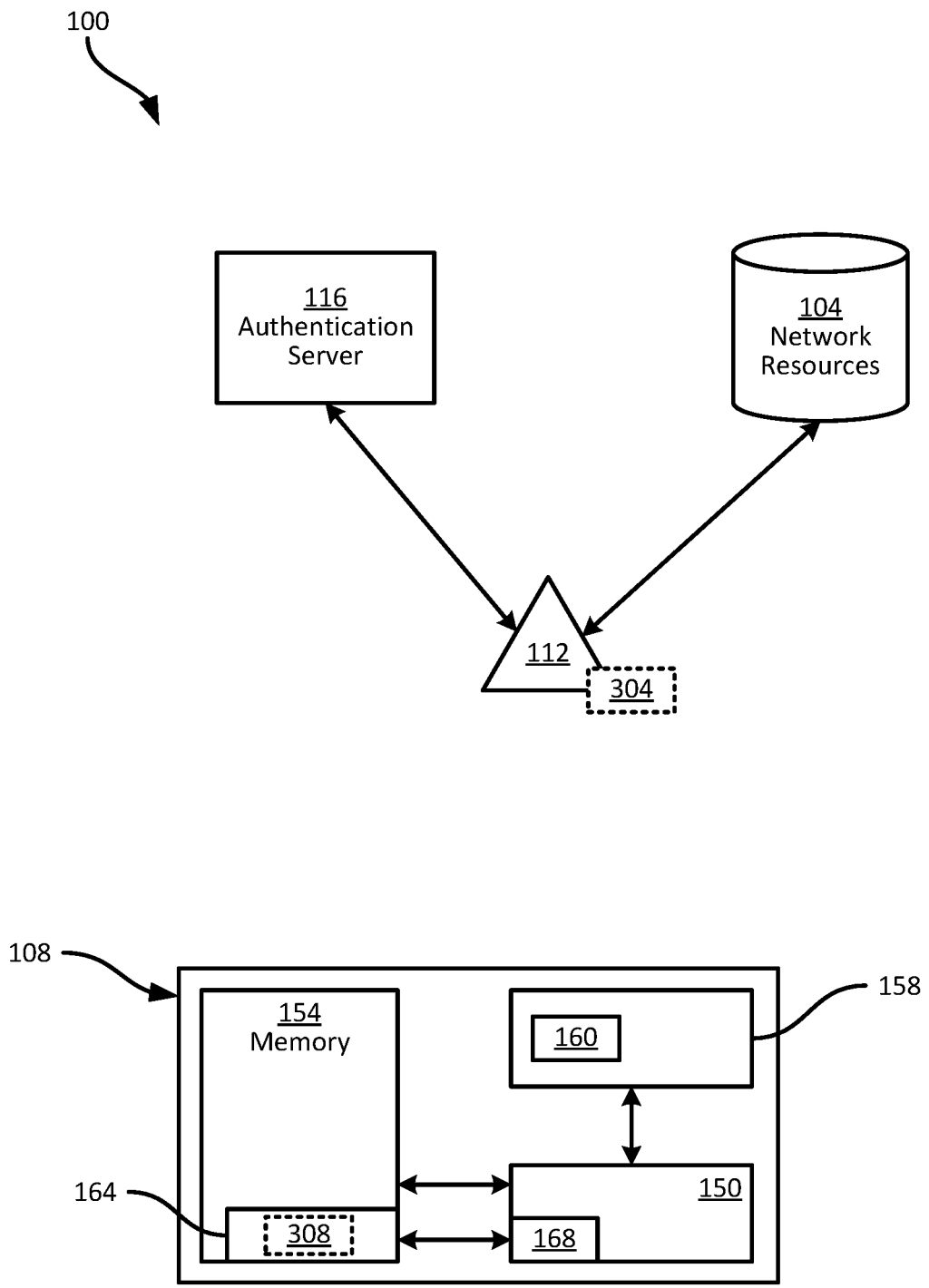
FIG. 5 is a diagram illustrating an example performance of block 225 of the method of FIG. 2.

In addition, as mentioned above, upon the occurrence of a disconnection event, the key value(s) 304 are automatically discarded at the communications interface 158, because the key value(s) 304 are not stored persistently. For example, the key value(s) 304 may be stored only in volatile memory at the communications interface 158, which is cleared upon a connection loss. Therefore, as shown in FIG. 5, the loss of connection between the AP 112 and the device 108 results in the communications interface 158 discarding the key values 304. The reauthentication data in the form of the key value(s) 308, however, is maintained in the secure memory 164 after the disconnection. As also shown in FIG. 5, the AP 112 continues to store the key value(s) 304, e.g. for a configurable period of time, after which the key value(s) 304 are also discarded from the AP 112 if there has been no further activity by the device 108 on the network.

As discussed below, beginning at block 230, the device 108 performs certain actions to attempt to reconnect to the network without needing to repeat the authentication process mentioned earlier. The performance of block 230 can follow the affirmative determination at block 225 by a wide variety of time periods. For example, in the case of an interference-related loss of connectivity, the performance of block 230 may occur only a few seconds, or even less, after block 225. However, in some cases, the disconnection event may result from the device 108 being turned off, and the performance of block 230 can occur minutes or hours later, e.g. the next day.

At block 230, following a command to reconnect to the AP 112 (or another AP in the network of the system 100), the device 108 is configured to determine whether reauthentication data corresponding to the network is stored in the secure memory 164. For example, the AP 112 can broadcast (e.g. in beacon frames or the like) a basic service set identifier (BSSID) that identifies the network of which the AP 112 is a part. The device 108, e.g. the controller 160, can store a list of identifiers of network identifiers, and can automatically attempt to connect to any networks on the list when such network identifiers are detected in beacons or other broadcasts from access points.

The reauthentication data (e.g. the intermediate keys 308) can be stored in the secure memory 164 along with a network identifier, such as the above-mentioned BSSID. Therefore, upon detecting a broadcast from the AP 112 containing the BSSID, the controller 160 and/or the processor 150 can query the secure memory (via the controller 168) to determine whether the secure memory 164 contains any entries corresponding to the BSSID. When the determination at block 230 is negative, the device 108 returns to block 205, and begins the authentication process mentioned above. In some examples the secure memory 164 can be configured to purge key material after a certain period of time, and therefore if sufficient time has elapsed between blocks 225 and 230, the reauthentication data may no longer be present in the secure memory 164.

Figure 6:
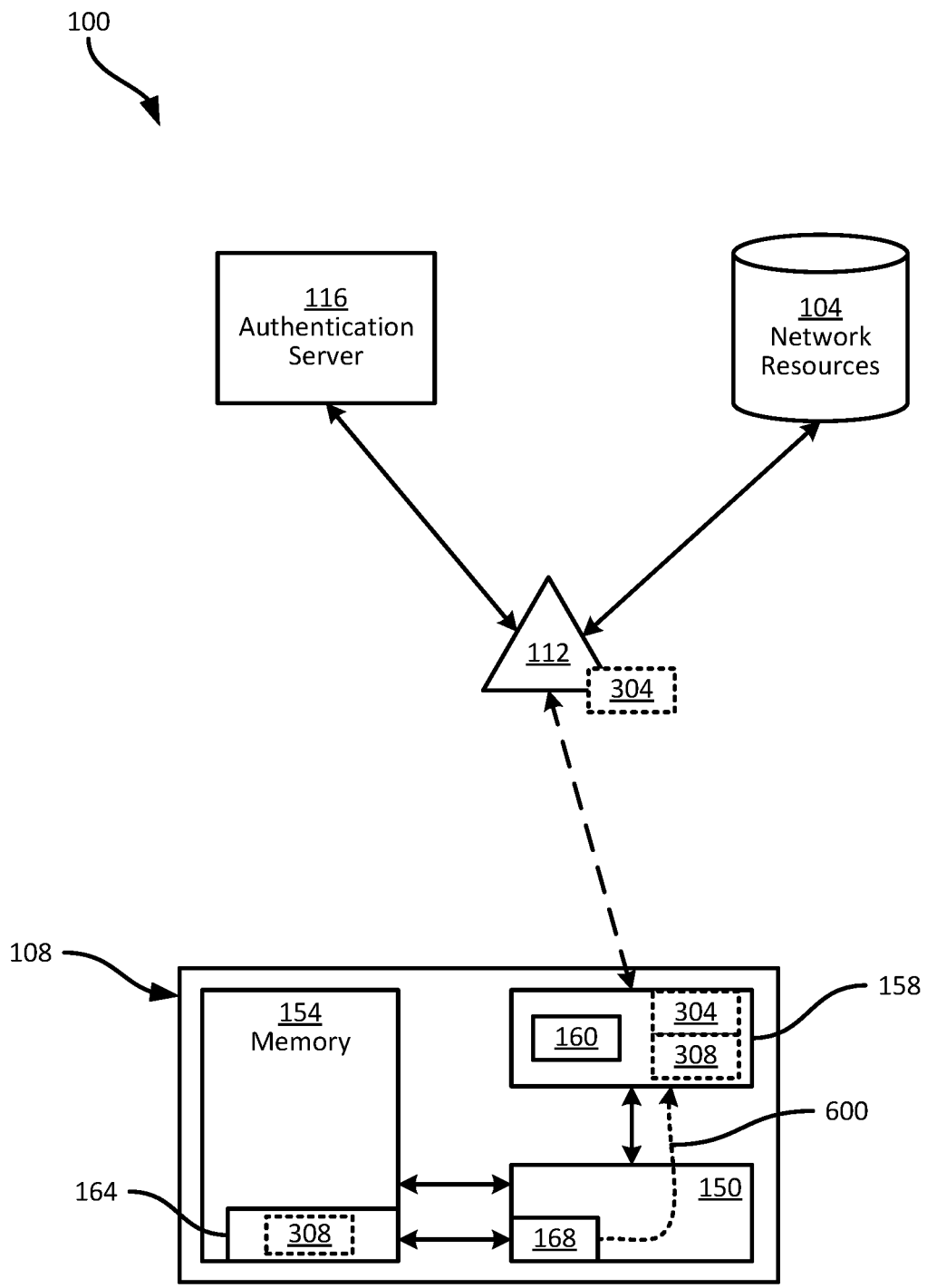
FIG. 6 is a diagram illustrating an example performance of blocks 230 and 235 of the method of FIG. 2.

In other examples, when the determination at block 230 is affirmative, the device 108 is configured to proceed to block 235. At block 235, the device 108 is configured to retrieve the key value(s) 304 using the reauthentication data. The device 108 can therefore retrieve the intermediate key value(s) 308 from the secure memory 164 via a suitable API call, and derive the key value(s) 304 from the intermediate key value(s) 308. In other examples, the device 108 can instead be configured to send a request to the controller 158 to perform a derivation operation on the reauthentication data within the secure storage 164. A request 600 is shown in FIG. 6, causing the controller 168 to perform an operation on the reauthentication data that yields, as an output, either the intermediate key value(s) 308 themselves, or the key value(s) 304, or at least a portion thereof. For example, the request can be a request to decrypt the intermediate keys 308 and send the intermediate keys 308 to the communications interface 158, whereupon the controller 160 of the communications interface 158 can use the intermediate keys 308 to generate the key values 304, e.g. the PMK, the PMKID and PMKSA.

As also shown in FIG. 6, the communications interface 158 once again stores the key value(s) 304, recovered from the reauthentication data. Returning to FIG. 2, at block 235 the device 108 also generates and sends an association request to the AP 112, to reconnect to the network. The association request can include an information element, such as a robust security network information element (RSNIE) containing the key value(s) 304, or at least a portion thereof. For example, the association request can include an RSNIE containing the PMKID.

At block 240, the device 108 is configured to determine whether reauthentication is necessary. The determination at block 240 is made according to the access point's response to the association request from block 235. In particular, the AP 112 is configured, in response to receiving an association request containing the PMKID, to determine whether a matching PMKID is still stored at the AP 112, indicating that the client device 108 has been authenticated. When the key value(s) 304 are still stored at the AP 112, the device 108 and the AP 112 repeat the handshake process mentioned above, and the device 108 can then resume accessing the network resources 104, without reauthenticating. In that case, the determination at block 240 is negative, and the device 108 can proceed to block 220. As will now be apparent, when the determination at block 240 is negative, the device 108 can resume access of the network resources 104 following only a connection time period equivalent to the association time period mentioned in connection with block 205. That is, the reconnection process does not consume both a connection time period and an authentication time period.

The AP 112 can also maintain a rule specifying a time period beyond which any inactive key value(s) (e.g. authentication data corresponding to a device that has not communicated with the AP 112 in the above time period) are discarded. In some cases, therefore, the response from the AP 112 to the association request indicates that reauthentication is required. The determination at block 240 is therefore affirmative, and the device 108 returns to block 205.

As will now be apparent, performance of the method 200 enables the device 108 to avoid, under at least some conditions, reauthenticating with the server 116 after a disconnection event. Therefore, the device 108 may restore access to the network resources 104 by performing a handshake process to obtain the PTK and GTK, without the additional sequence of messages exchanged with the server 116 at block 205. Reconnection may therefore consume less time, e.g. about 0.5 seconds, in comparison to reauthentication. Reconnection may therefore also impose reduced demands on the system 100 than reauthentication.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A method in a client computing device, the method comprising:
   establishing an association with a communications network in a first connection time period;
   via an authentication session with an authentication server of the communications network in an authentication time period following the first connection time period, obtaining at least one key value for use in accessing the communications network;
   storing reauthentication data associated with the at least one key value;
   responsive to disconnecting from the communications network, discarding the at least one key value from a memory of the client computing device and retaining the reauthentication data having an intermediate key value from a root key, where the intermediate key value is associated to a particular access point;
   responsive to a reconnection command:
      deriving the discarded at least one key value from the intermediate key value of the root key,
      establishing a further association with the communications network in a second connection time period by sending an association request to the communications network, the association request containing the at least one key value, and
      accessing network resources via the communications network following the second connection time period.

2. The method of claim 1, wherein storing the reauthentication data includes storing the reauthentication data in a persistent storage device.

3. The method of claim 1, further comprising storing an identifier of the communications network in association with the reauthentication data.

4. The method of claim 3, wherein the reconnection command includes a reconnection network identifier; the method further comprising:
prior to retrieving the at least one key value, determining that the reconnection network identifier matches the identifier stored in association with the reauthentication data.

5. The method of claim 1, further comprising:
after a time period, discarding the reauthentication data.

6. The method of claim 1, further comprising:
receiving, in response to the association request, a reauthentication command from an access point;
repeating the authentication process to obtain at least one further key value; and
storing further reauthentication data associated with the at least one further key value.

7. A computing device, comprising:
a memory;
a communications interface; and
a controller configured to:
establish an association with a communications network in a first connection time period;
via an authentication session with an authentication server of the communications network in an authentication time period following the first connection time period, obtain at least one key value for use in accessing the communications network;
store, in the memory, reauthentication data associated with the at least one key value;
responsive to detecting a disconnection from the communications network, discard the at least one key value from the memory and retaining the reauthentication data having an intermediate key value from a root key, where the intermediate key value is associated to a particular access point;
responsive to a reconnection command:
derive the discarded at least one key value from the intermediate key value of the root key,
establish a further association with the communications network in a second connection time period by sending an association request to the communications network, the association request containing the at least one key value, and
access network resources via the communications network following the second connection time period.

8. The computing device of claim 7, further comprising a secure memory;
wherein the controller is configured, to store the reauthentication data, to store the reauthentication data in a persistent storage device.

9. The computing device of claim 7, wherein the controller is further configured to store an identifier of the communications network in association with the reauthentication data.

10. The computing device of claim 9, wherein the reconnection command includes a reconnection network identifier; the controller further configured to:
prior to retrieving the at least one key value, determine that the reconnection network identifier matches the identifier stored in association with the reauthentication data.

11. The computing device of claim 7, wherein the controller is further configured, after a time period, to discard the reauthentication data.

12. The computing device of claim 7, wherein the controller is further configured to:
receive, in response to the association request, a reauthentication command from an access point;
repeat the authentication process to obtain at least one further key value; and
store further reauthentication data associated with the at least one further key value.

13. A non-transitory computer readable medium storing instructions executable by a controller of a computing device having a memory and a communications interface, to:
establish an association with a communications network in a first connection time period;
via an authentication session with an authentication server of the communications network in an authentication time period following the first connection time period, obtain at least one key value for use in accessing the communications network;
store, in the memory, reauthentication data associated with the at least one key value;
responsive to detecting a disconnection from the communications network, discard the at least one key value from the memory and retain the reauthentication data having an intermediate key value from a root key, where the *intermedia* key value is associated to a particular access point;
responsive to a reconnection command:
derive the discarded at least one key value from the intermediate key value of the root key,
establish a further association with the communications network in a second connection time period by sending an association request to the communications network, the association request containing the at least one key value, and
access network resources via the communications network following the second connection time period.

14. The non-transitory computer readable medium of claim 13, wherein execution of the instructions configures the controller, to store the reauthentication data, to store the reauthentication data in a persistent storage device.

* * * * *